United States Patent
Emert

(10) Patent No.: US 9,982,973 B2
(45) Date of Patent: May 29, 2018

(54) WATER PENETRATING DART

(71) Applicant: John Richard Emert, Melbourne, FL (US)

(72) Inventor: John Richard Emert, Melbourne, FL (US)

(*) Notice: Subject to any disclaimer, the term of this patent is extended or adjusted under 35 U.S.C. 154(b) by 0 days. days.

(21) Appl. No.: 15/602,600

(22) Filed: May 23, 2017

(65) Prior Publication Data
US 2017/0336181 A1 Nov. 23, 2017

Related U.S. Application Data

(60) Provisional application No. 62/340,369, filed on May 23, 2016.

(51) Int. Cl.
*F42B 6/00* (2006.01)
*F41B 1/00* (2006.01)

(52) U.S. Cl.
CPC ............... *F42B 6/003* (2013.01); *F41B 1/00* (2013.01)

(58) Field of Classification Search
CPC ............ F41B 1/00; F42B 6/003; F42B 12/68
USPC ................... 473/575, 576, 578, 581; 124/62
See application file for complete search history.

(56) References Cited

U.S. PATENT DOCUMENTS

| | | | | |
|---|---|---|---|---|
| 186,651 A * | 1/1877 | White | ................. | F41B 1/00 124/62 |
| 873,628 A * | 12/1907 | Stivers | ................. | F42B 6/003 473/578 |
| 1,609,013 A * | 11/1926 | De Cavin | ................. | F41B 1/00 124/62 |
| 3,388,696 A * | 6/1968 | Hoverath | ................. | F41B 1/00 124/41.1 |
| 3,457,921 A * | 7/1969 | Waldeisen | ................. | F42B 12/54 102/512 |
| 4,283,061 A * | 8/1981 | Jordan | ................. | F42B 6/00 473/586 |
| 4,537,176 A * | 8/1985 | Stravitz | ................. | F42B 6/00 124/41.1 |
| 4,651,999 A * | 3/1987 | Sturm | ................. | F42B 6/04 473/575 |
| 4,836,557 A * | 6/1989 | Polando | ................. | F42B 12/362 473/578 |
| 4,858,935 A * | 8/1989 | Capson | ................. | F42B 12/385 473/570 |
| 5,188,373 A * | 2/1993 | Ferguson | ................. | F42B 12/385 473/578 |
| 5,718,214 A * | 2/1998 | Altman | ................. | F41B 1/00 124/62 |

(Continued)

*Primary Examiner* — Alexander Niconovich
(74) *Attorney, Agent, or Firm* — Dunlap Bennett & Ludwig PLLC

(57) ABSTRACT

A water penetrating blowgun dart is provided. The blowgun dart has a funnel removably attached to a tail end of the dart shaft so that upon contact with a water surface, the funnel moves from an engaged configuration to a disengaged configuration. The tail end may provide a slot for snugly receiving an eye, wherein the tail end and the eye have cooperating grooves so that when in the engaged configuration, the eye and tail end are secured with a filament that slightly protrudes from the flush outer surface of the shaft and eye. The protruding filament frictionally engages the funnel in the engaged configuration so that the funnel remains engaged with the shaft prior to hitting the water's surface.

6 Claims, 4 Drawing Sheets

(56) References Cited

U.S. PATENT DOCUMENTS

| | | | | |
|---|---|---|---|---|
| 5,928,049 | A * | 7/1999 | Hudson | A63H 27/004 446/15 |
| 6,108,911 | A * | 8/2000 | Hoch | F42B 6/00 30/123 |
| 6,764,420 | B2 * | 7/2004 | Cyr | F42B 6/06 455/98 |
| 7,364,521 | B2 * | 4/2008 | Yang | A63B 65/02 248/206.2 |
| 8,123,637 | B1 * | 2/2012 | Demko | F42B 6/003 124/62 |
| 8,297,268 | B2 * | 10/2012 | Kenworthy | F41B 1/00 102/520 |
| 9,228,812 | B1 * | 1/2016 | White | F42B 6/04 |
| 2011/0187053 | A1 * | 8/2011 | Mayorkis | A63F 9/02 273/408 |
| 2013/0213377 | A1 * | 8/2013 | Kenworthy | F41B 1/00 124/62 |
| 2015/0157001 | A1 * | 6/2015 | Mayer | A01K 91/06 43/4.5 |

\* cited by examiner

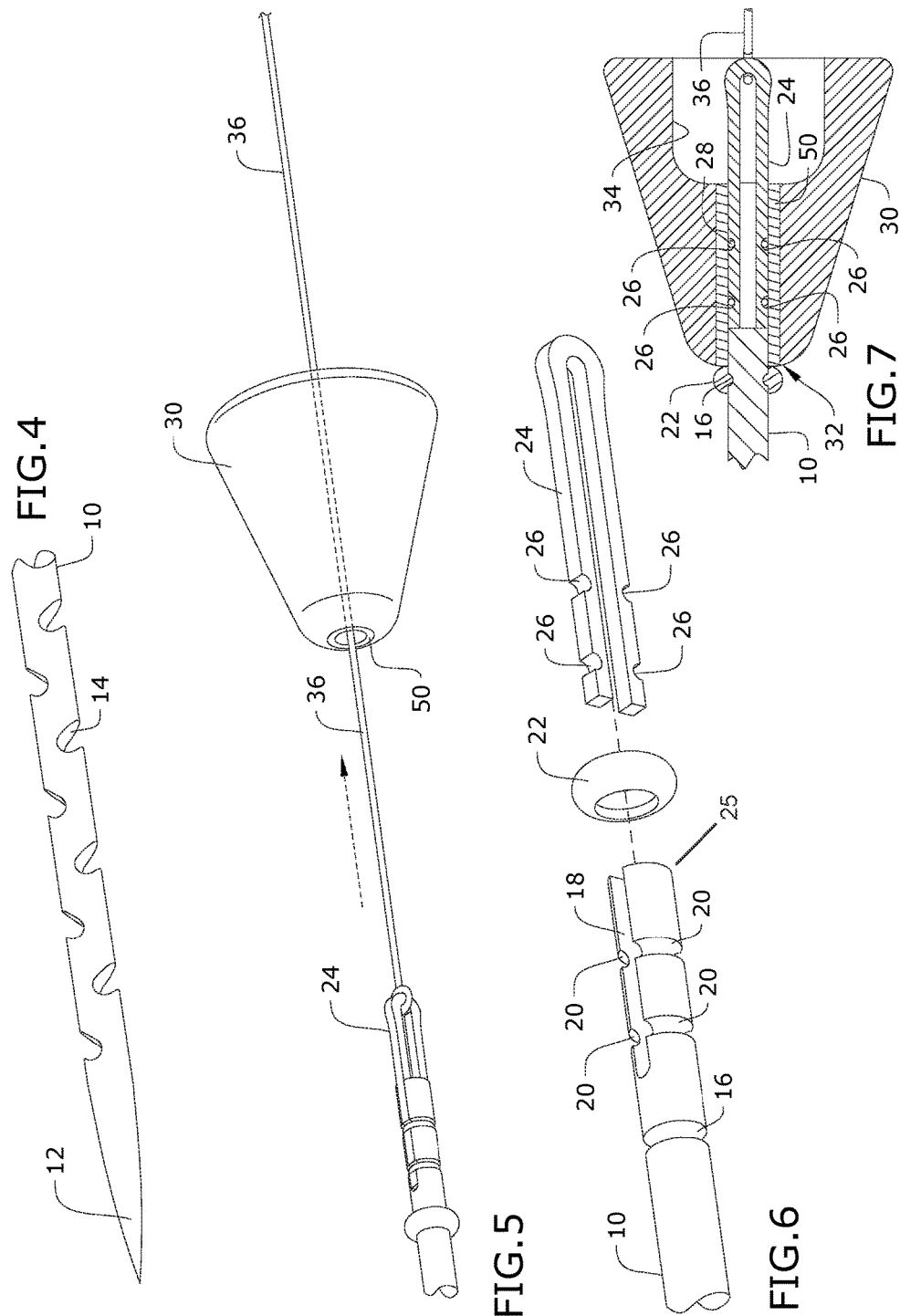

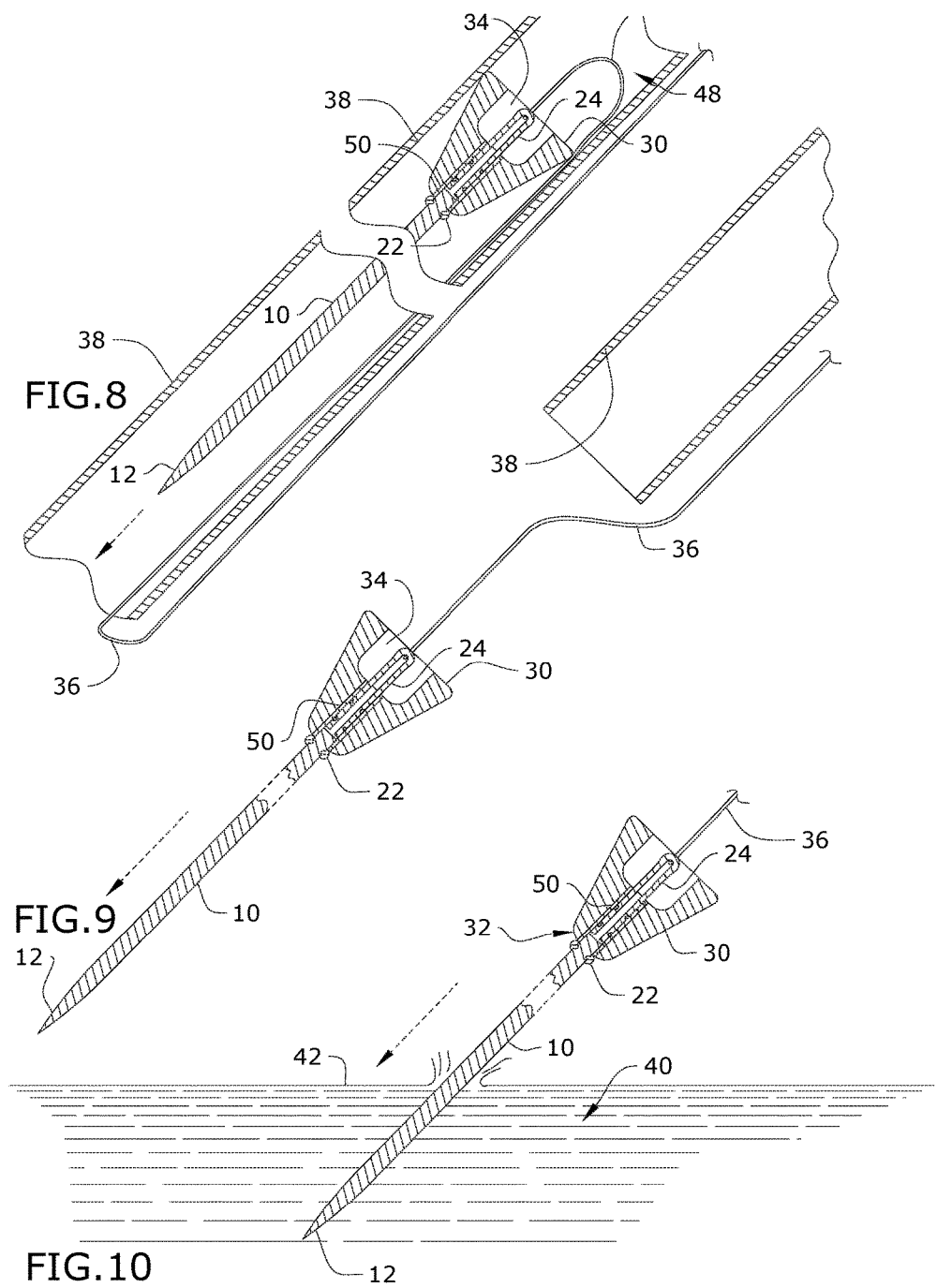

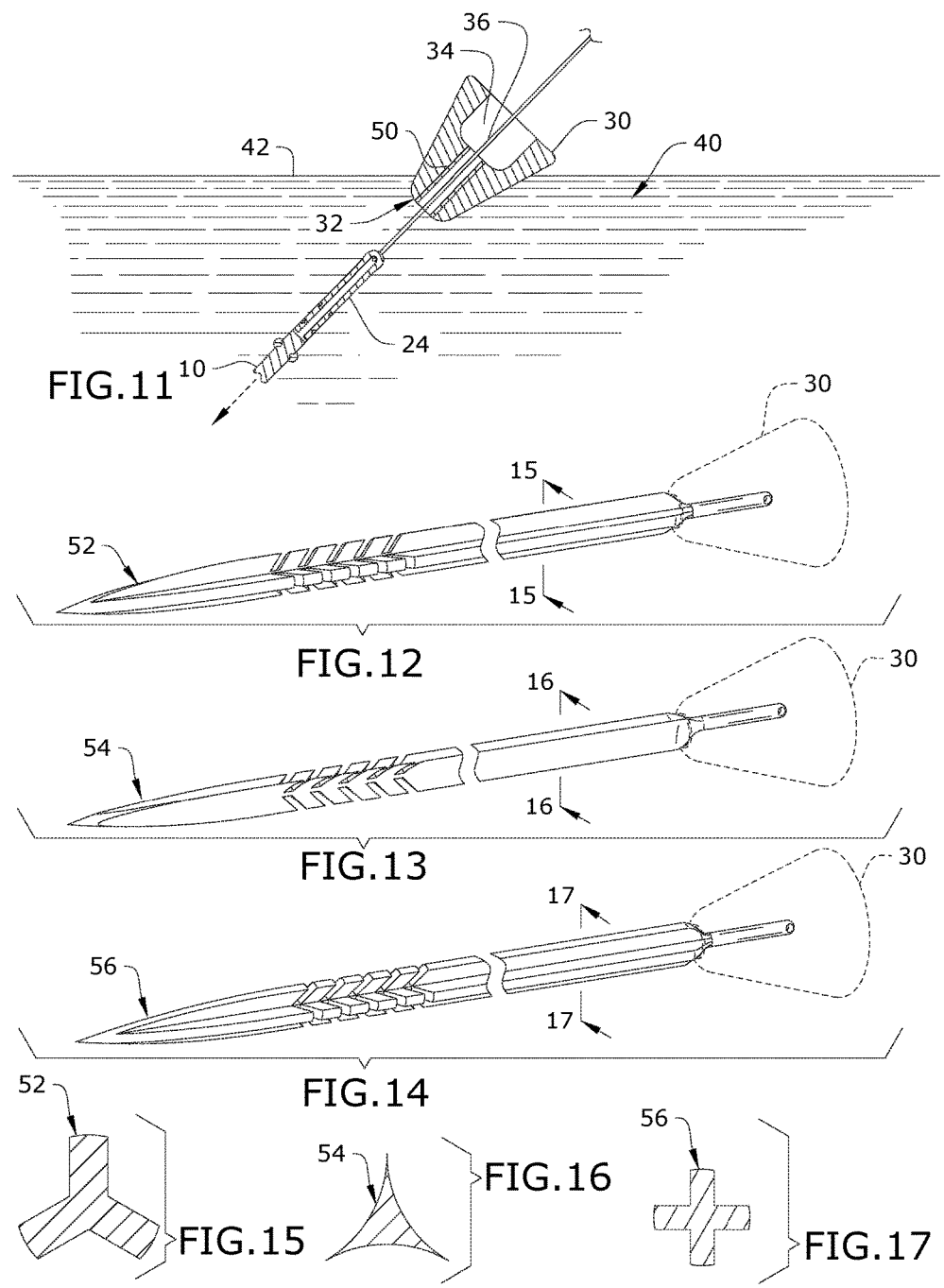

WATER PENETRATING DART

CROSS-REFERENCE TO RELATED APPLICATION

This application claims the benefit of priority of U.S. provisional application No. 62/340,369, filed 23 May 2016, the contents of which are herein incorporated by reference.

BACKGROUND OF THE INVENTION

The present invention relates to blowguns and, more particularly, to a water penetrating dart for a blowgun.

A fishing blowgun is basically a blowgun that has a fishing rod and reel attached, and using a blowgun dart interconnected by fishing line. The basic concept is to shoot the blowgun dart at desired target submerged in the water, and utilize the rod and reel to bring in the pierced target. Traditional blowgun darts, however, only work if the target is not deeper than the shaft of the dart. The reason for this is that when the funnel of such darts hit the water surface, the resulting drag drastically slows the velocity of the dart, diminishing its force. Furthermore, the trajectory of the dart once the funnel portion is forced through the water's surface is very unpredictable. As a result, precision and penetration power are compromised if the target is any deeper than the shaft of the dart.

As can be seen, there is a need for a blowgun dart configured so that its funnel separates from the shaft at the surface of the water, allowing for a significant reduction in drag as only the shaft penetrates the water while pulling the fishing line behind it, wherein a hole in the funnel allows the fishing line to pass through seamlessly as the funnel remains at the surface of the water and the shaft continues to penetrate the water for several feet. Thereby enabling the dart to travel forcefully in a straight line, increasing accuracy and power in penetrating targets below the water surface.

SUMMARY OF THE INVENTION

In one aspect of the present invention, a water piercing blowgun dart having a shaft extending from a tip to a tail end, wherein the shaft is adapted to travel tip-first in a straight line through a fluid; and a funnel moveable from an engaged configuration attached to the tail end to a disengaged configuration when the funnel contacts a surface of said fluid, wherein the funnel is attached to the tail end solely by frictional engagement between an inner portion of the funnel and at least one protrusion along the tail end, wherein the inner portion is defined by a through-hole; and further comprising a funnel cavity communicating to the through-hole, wherein a diameter of the funnel cavity is approximately twice a diameter of the through-hole, wherein the at least protrusion comprises filament wrapped about the tail end; and further comprising a fishing line connected to the tail end so that the fishing line runs through the funnel cavity.

In another aspect of the present invention, the water piercing blowgun dart includes a plurality of circumferential grooves provided along the tail end; an eye slot extending from the tail end longitudinally along the shaft; an eye having a plurality of eye grooves, the eye flush within the eye slot so that the plurality of eye grooves aligns with the plurality of circumferential grooves; and a filament wrapped around at least one of the plurality of aligned grooves so as to protrude above a circumferential surface of the tail end, wherein the filament protrudes approximately one millimeter above said circumferential surface.

These and other features, aspects and advantages of the present invention will become better understood with reference to the following drawings, description and claims.

BRIEF DESCRIPTION OF THE DRAWINGS

FIG. 4 is a perspective detail view of a tip of the blowgun dart of an exemplary embodiment of the present invention;

FIG. 5 is a perspective detail view of an exemplary embodiment of the present invention demonstrating the water piercing dart moving to a disengaged configuration;

FIG. 6 is an exploded detail view of an exemplary embodiment of the present invention;

FIG. 7 is a section view of an exemplary embodiment of the present invention, taken along line 7-7 of FIG. 2;

FIG. 8 is a section view of an exemplary embodiment of the present invention just prior to expulsion;

FIG. 9 is a section view of an exemplary embodiment of the present invention just after to expulsion;

FIG. 10 is a section view of an exemplary embodiment of the present invention, demonstrating the blowgun dart penetrating water;

FIG. 11 is a section view of an exemplary embodiment of the present invention, taken along line 11-11 of FIG. 1;

FIG. 12 is a perspective view of an exemplary embodiment of the present invention;

FIG. 13 is a perspective view of an exemplary embodiment of the present invention;

FIG. 14 is a perspective view of an exemplary embodiment of the present invention;

FIG. 15 is a section detail view of an exemplary embodiment of the present invention, taken along line 15-15 of FIG. 12;

FIG. 16 is a section detail view of an exemplary embodiment of the present invention, taken along line 16-16 of FIG. 13; and FIG. 17 is a section detail view of an exemplary embodiment of the present invention, taken along line 17-17 of FIG. 14.

DETAILED DESCRIPTION OF THE INVENTION

Figure 1:
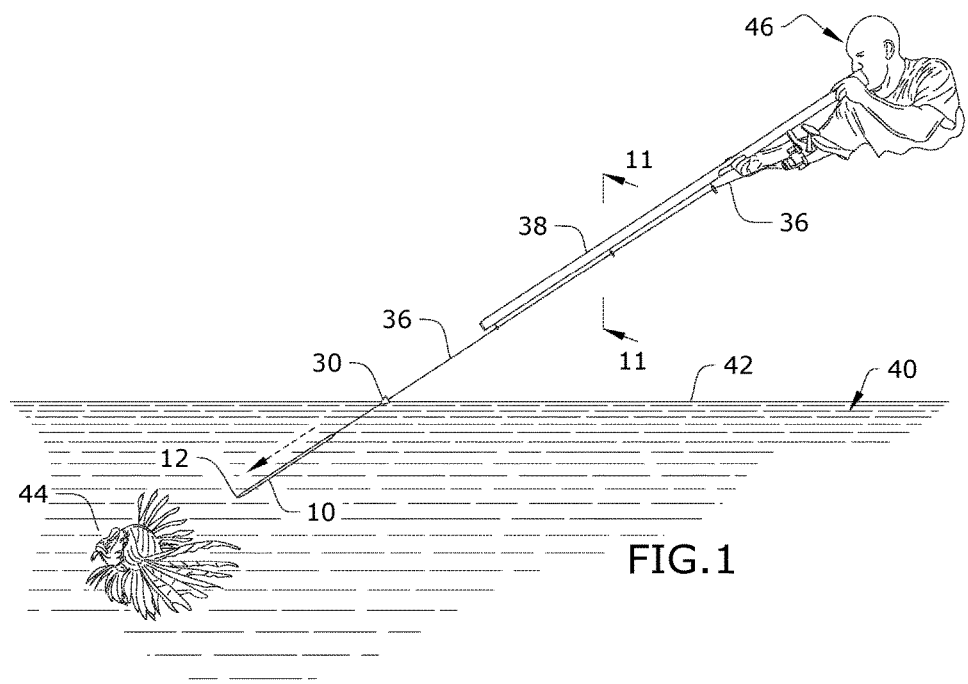
FIG. 1 is a side elevation view of an exemplary embodiment of the present invention shown in use.
Figure 2:
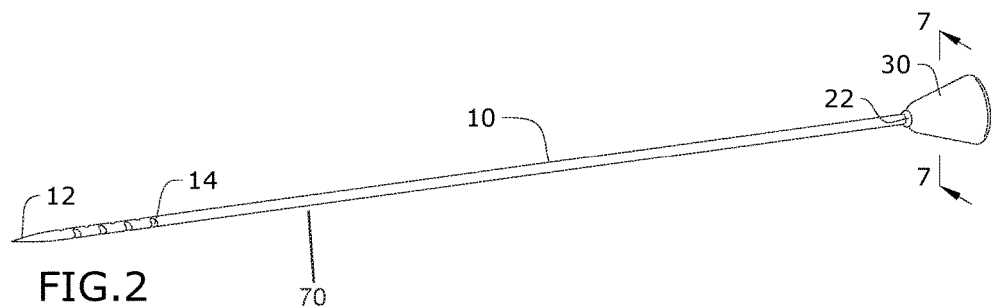
FIG. 2 is a perspective view of an exemplary embodiment of a water piercing blow dart the present invention.
Figure 3:
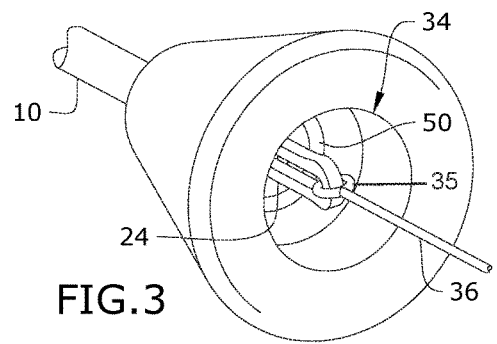
FIG. 3 is a rear perspective view of an exemplary embodiment of a funnel of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention includes a water penetrating blowgun dart having a funnel removably attached to a tail end of the dart shaft so that upon contact with a water surface, the funnel moves from an engaged configuration to a disengaged configuration. The tail end may provide a slot for snugly receiving an eye, wherein the tail end and the eye have cooperating grooves so that when in the engaged configuration, the eye and tail end are secured with a filament that slightly protrudes from the flush outer surface of the shaft and eye. The protruding filament frictionally engages the funnel in the engaged configuration so that the funnel remains engaged with the shaft prior to hitting the water's surface.

Referring to FIGS. 1 through 17, the present invention may include a blowgun dart 70 having a shaft 10 extending between a piercing tip 12 and a tail end 25. In certain embodiments, the shaft 10 may be a 3/32" rod between nine and ten inches in length. Adjacent to the tip the shaft 10 may provide spaced apart barb cutouts 14. The blowgun darts 70, 52, 54, and 56, as illustrated in FIGS. 12-17, include shaft, tip and barbs components that may take different shapes (round, flattened, triangular, bayonet shaped, etc.) so long as they function in accordance with the present invention as described herein; namely, to work in unison to accomplish the ability of funnel 30 separation and deeper water penetration. To that end, the shaft 10 may be made of a material that can be repeatedly used without failing, such as stainless steel or titanium. The tip 12 is pointed and sharp, enabling the dart 70 to pierce the water, travel submerged several feet in a straight line, and pierce the desired target 44. The barbs 14 may vary in shape and relative placement from dart 70 to dart 52, 54 and 56, as long as they are adapted to prevent the desired target 44 from escaping once it is pierced by the tip 12 of the shaft 10 where the barbs 14 are located. In certain embodiments, there may be six to eight alternating barbs 14 opposite of each other, starting approximately 1/2" back from the tip 12.

The shaft 10 provides an eye slot 18 extending longitudinally from the tail end 25 for a predetermined length, such as 5/16". A plurality of spaced apart circumferential grooves 20 are provided in the shaft 10 near the tail end 25, each groove 20 interrupted by the eye slot 18 on the tail end 25 of the shaft 10. Spaced apart from the plurality of circumferential grooves 20 and uninterrupted by the eye slot 18 may be a stopper groove 16 disposed just tip-ward of the eye slot 18. An annular stopper 22 may be dimensioned to snugly nest in the stopper groove 16.

A tuning fork shaped eye 24 provides a plurality of cooperating eye grooves 26 on each tine. The eye grooves 26 are spaced apart to align with the plurality of spaced apart circumferential grooves 20 when the eye 24 slides into the eye slot 18 to an enabled condition. The outer surface of the tines of the eye 24 matches the diameter of the shaft 10 so the two surfaces are flush in the enabled condition. In the enabled condition, a filament 28, such as nylon line, may be used to secure the eye 24 to the shaft 10 along at least one pair of aligned eye and circumferential grooves 26 and 20, wherein the filament 28 protrudes from the grooves 26 and 20 beyond the circumference of the shaft 10, in certain embodiments, by approximately 1 mm. Adhesive may be also supplied for further securement. In other embodiments, the filament 28 may be any material capable of providing a frictional engagement when slightly protruding from said grooves 26 and 20. An eyelet 24 may connect the apex portion of the tuning fork shaped eye 24 to fishing line 36.

A funnel 30 adapted to attach to the tail end 25 of the shaft 10 for aerodynamic flight of the dart 70 is provided. The funnel 30 may be made of lightweight buoyant material. The funnel 30 has a tapered, aerodynamic shape that extends from a nose to a stern providing funnel cavity 34. A through-hole 32 extends from the nose to the funnel cavity 34. The funnel cavity 34 is dimensioned to be bigger than the through-hole 32 so as to guide fishing line 36 therethrough with reduced friction, in certain embodiments, the funnel cavity 34 has approximately twice the diameter as the through-hole 32, having a 5/16" diameter. A funnel sleeve 50 of hard, lightweight material snugly nests in the through-hole 32 so that the funnel sleeve 50 and funnel 30 slides over the shaft 10 and eye 24 in the enabled condition, forming an engaged configuration. In the engaged configuration, the interaction of the surface of the protruding filament 28 and the funnel sleeve 50 creates a frictional engagement, removably securing the two objects together. In the engaged configuration, the fishing line 36 extending from the eyelet 24 and passes through both the through-hole 32 and the funnel cavity 34 to a reel of the blowgun.

In the engaged configuration, the funnel sleeve 50, and thus the nose of the funnel 30, abuts the stopper 22 in the stopper groove 16. In effect, this is where the funnel sleeve 50 rests, stopping the funnel 30 from sliding down the shaft 10, while enabling the acceleration of the blowgun dart 70 in the barrel 38 of the blowgun. In short, the stopper groove 16 acts as the foundation of the stopper 22, tying the stopper 22 into the shaft 10.

After the dart 70 is ejected from the barrel 38 of the blowgun, upon contact with the water surface 42 of a body of water 40, the funnel 30 separates from the shaft 10, as illustrated in FIGS. 9-11. The outward flared shape of the funnel 30 provides substantial surface area (relative to the tip 12) for the resulting drag force of the water-funnel interaction to exceed the frictional engagement of the filament 28 and the funnel sleeve 50, urging the funnel 30 to a disengaged configuration, as illustrated in FIGS. 1, 5 and 11. In the disengaged configuration, the fishing line 36 still slides through the through-hole 32 and funnel cavity 34 as the submerged dart shaft 10 continues to penetrate deeper water towards its submerged target 44. Once the target 44 is pierced the funnel 30 essentially becomes a bobber at the water surface 42 that also indicates the direction of travel of the desired target. Retrieving the dart 70 and pierced target 44 involves reeling in the fishing line 36.

It should be noted that typically a high-pressure region 48 applied by an operator's 46 lungs urges the dart 70 from the barrel 38, though there could be other applications to expel said dart 70 from the barrel 38. In the typical circumstance the dart 70 and funnel 30 remain engaged upon ejection, based on the above-mentioned frictional engagement and their shared direction as urged by the high-pressure region 48 and the barrel 38 of the blowgun.

It should also be noted that the thickness and length of the shaft 10, and the size of the barbs 14 can vary depending on multiple factors. Similarly, the length and width of the funnel 30 can vary depending on multiple factors. Some of those factors that would change the shaft and funnel include, but are not limited to, whether or not the operator 46 is an adult or child, the lung power of the operator 46, the size of the barrel 38 of the fishing blowgun, the type of target 44 to be pierced, etc.

A method of using the present invention may include the following. The blowgun dart 70 disclosed above may be provided. The operator 46 slides the funnel 30 onto the tail end 25 of the shaft 10 until it rests on the stopper 22, forming the engaged configuration. The fishing line 36 runs from the rear portion of the eye 24 through the through-hole 32 and operatively associates with the reel of a blowgun. The operator 46 then slides the engaged dart 70 into the barrel 38 tip of the fishing blowgun, funnel 30 first, backing the blowgun dart 70 all the way down the barrel 38 by gently blowing into the tip of the barrel 38. The operative association of the blowgun dart 70 and the reel may include opening and close the bail on the reel during this process. Then the operator 46 makes sure the funnel 30 is resting properly in the barrel 38 at a mouth piece end. After finding a target 44 below the water's surface 42, the operator 46 takes aim, opens the bail, and shoots. Upon hitting the water's surface 42, the funnel 30 separates from the shaft 10 to the disengaged configuration when the water surface 42 is pierced. This allows the dart shaft 10 to penetrate the water 40 for several feet, travel in a straight line, and have enough penetration power to pierce the target 44. The fishing line runs through the through-hole 32 in the funnel 30 and is attached to the back end of the eye 24. During the engaged configuration, minimal frictional engagement keeps the shaft 10 and funnel 30 together when the blowgun dart 70 is in the barrel 38 of the fishing blowgun and it is pointed down toward the water surface 42. The minimal frictional engagement also allows for seamless separation of the shaft and funnel upon impact at the water surface 42.

It should be understood, of course, that the foregoing relates to exemplary embodiments of the invention and that modifications may be made without departing from the spirit and scope of the invention as set forth in the following claims.

What is claimed is:

1. A blowgun dart, comprising:
    a shaft extending from a tip to a tail end, wherein the shaft is adapted to travel tip-first in a straight line through a fluid;
    a funnel moveable from an engaged configuration attached to the tail end to a disengaged configuration when the funnel contacts a surface of said fluid, wherein the funnel is attached to the tail end solely by frictional engagement between an inner portion of the funnel and at least one protrusion along the tail end;
    a plurality of circumferential grooves provided along the tail end;
    an eye slot extending from the tail end longitudinally along the shaft;
    an eye having a plurality of eye grooves, the eye flush within the eye slot so that the plurality of eye grooves aligns with the plurality of circumferential grooves; and
    a filament wrapped around at least one of the plurality of aligned grooves so as to protrude above a circumferential surface of the tail end.

2. The blowgun dart of claim 1, wherein the inner portion is defined by a through-hole; and further comprising a funnel cavity communicating to the through-hole, wherein a diameter of the funnel cavity is approximately twice a diameter of the through-hole.

3. The blowgun dart of claim 2, further comprising a fishing line connected to the tail end so that the fishing line runs through the funnel cavity.

4. The blowgun dart of claim 1, wherein the at least protrusion comprises filament wrapped about the tail end.

5. The blowgun dart of claim 1, wherein the filament protrudes approximately one millimeter above said circumferential surface.

6. The blowgun dart of claim 1, wherein a stopper is disposed along the tail end, and wherein the funnel abuts the stopper.

* * * * *